June 22, 1965     B. W. McCOMB ETAL     3,190,210

EXTRUDER HEAD FOR FOOD STUFF

Filed July 16, 1962     2 Sheets-Sheet 1

INVENTORS.
Kenneth H. McComb
Bruce W. McComb
BY

ATTORNEYS

INVENTORS.
Kenneth H. McComb
Bruce W. McComb
BY
ATTORNEYS

# United States Patent Office 3,190,210
Patented June 22, 1965

3,190,210
EXTRUDER HEAD FOR FOOD STUFF
Bruce W. McComb and Kenneth H. McComb, both of 6099 S. Elati St., Littleton, Colo.
Filed July 16, 1962, Ser. No. 209,976
3 Claims. (Cl. 99—238)

This invention relates to food processing equipment and more particularly to a liquidizer and extruder for ground edible grains.

Certain types of edible grains, in general called cereal grains, when subjected to a very high pressure become liquidized and on release of the pressure, the liquid mass solidifies to produce a puffed or expanded product. The liquidized grain may be extruded through small orifices to provide different shapes of product. In the process of subjecting the grains (pre-ground) to the high pressure, a substantial amount of heat is produced which at least partially cooks the grain.

It is an object of the invention to provide an improved machine for expanding or exploding cereal grains to produce a uniform, high-quality product. It is a further object of the invention to provide an extruding die which may be readily cleaned and replaced on the machine. Additionally the device provides a very high pressure for completely liquidizing the cereal grain to produce a high quality exploded cereal. A blender provides means for controlling the moisture content of the ground grain prior to its treatment by high pressure.

These and other objects of the invention may be readily ascertained by referring to the following description and appended illustrations in which FIG. 1 is a side elevational view of a device according to the invention;

Figure 1:
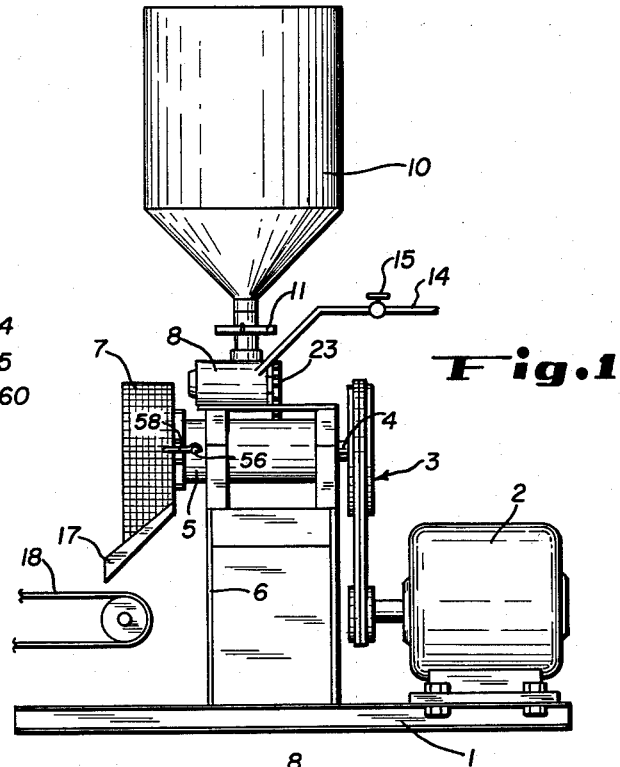

In the general view shown in FIG. 1, a base 1 has mounted thereon an electric motor 2 interconnected by means of drive mechanism shown in general by 3 with a shaft 4. The shaft 4 is mounted in a housing 5 supported on a frame 6. A screen cage or covering 7 is mounted over the front end of the machine opposite the drive 3. The housing is fed from a blender 8 which in turn is fed from a hopper 10 controlled by a slide valve 11. A water line 14 having a control valve 15 is interconnected with the blender 8.

The screen covering 7 encloses the cutoff end of the machine and is provided with a lower chute 17 which feeds to a belt conveyor 18. In place of the belt conveyor an oven or other finishing means may be provided.

Figure 2:
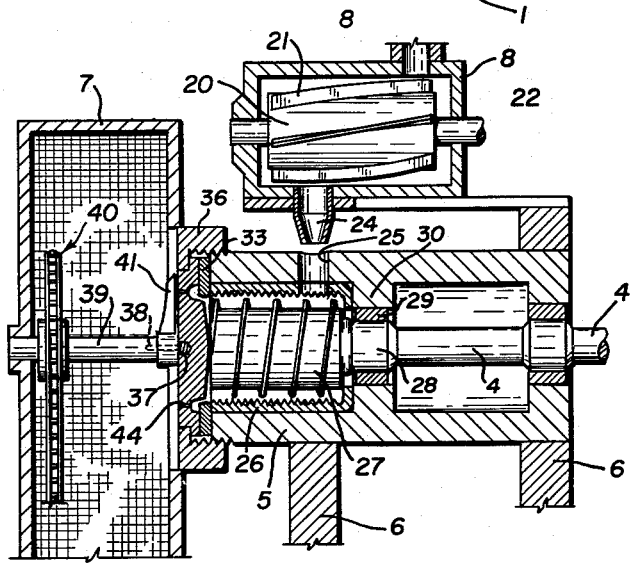
FIG. 2 is an enlarged detail in cross-section of the extrusion mechanism of the device of FIG. 1.
Figure 3:
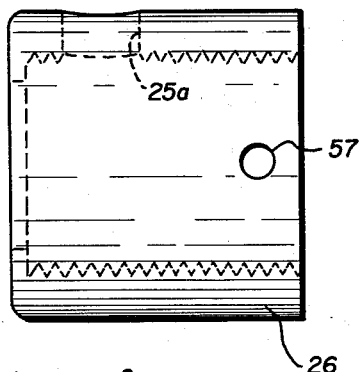
FIG. 3 is a detailed view of an insert for the auger mechanism of the machine.
Figure 4:
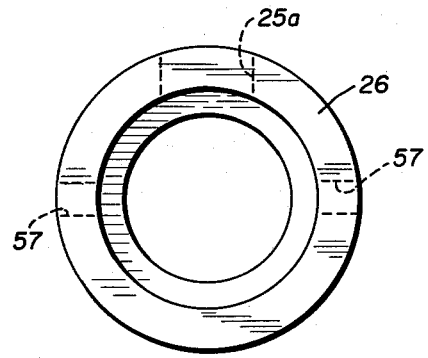
FIG. 4 is a front elevational view of the insert of FIG. 3.

The blender shown in detail in FIG. 2 includes a housing 8 in which is mounted a rotor 20 having helical blades 21 mounted thereon. The rotor 20 is mounted on a shaft 22 which is driven by drive means 23, shown in FIG. 1, interconnected with a motor, not shown, so as to rotate the rotor 20. Water from the line 14 controlled by valve 15 may be permitted to drip into the ground grain flowing into the blender from the hopper 10 so as to provide a ground grain having the proper moisture conditions. The amount of moisture introduced into the grain is quite small under normal conditions, since the ground grain required for the operation is only slightly dampened. With corn, for example, the total amount of moisture in the grain should not exceed about 10 percent. Grain from the blender drops through a nozzle 24 into an enlarged opening 25 in the housing 5.

An insert 26 is mounted in the housing 5 and the insert 26 is provided with an internal thread. An opening 25a in the insert 26 is arranged to register with the opening 25 of the housing when the insert is positioned for operation. Mounted in the insert is an auger or screw 27 mounted on the shaft 4. The shaft is provided with a bearing portion 28 mounted in a sleeve or other suitable bearing 29 in a pillow block 30. The auger is provided with a thread which is opposite the winding of the thread in the insert. The auger is a very close fit in the insert. The clearance between the auger and the insert is between $\frac{1}{32}$ and $\frac{1}{64}$ of an inch. The auger thread is, of course, of such a lead as to advance contained material toward the discharge end of the machine. As shown in FIG. 2, the pitch of the threads on the auger is on a ratio of about 5-to-2 of the pitch of the threads in the sleeve. A washer 33 is mounted by means of bolts, not shown, on the insert 26 at its opening, and a die block 35 is mounted adjacent the washer 33. A threaded ring 36 secured the die block 35 in position on the housing. The die block 35 is provided with a small threaded opening 37 in its front face and a stud 38 is threaded into the opening 37. A rotary sleeve 39 is mounted on the stud 38 and the sleeve is driven by drive means shown in general by 40 which in turn is driven by a motor, not shown. A cut off knife 41 is interconnected with the sleeve and rotates therewith to cut off the extruded material exuding from holes 44 in the die block 35.

Figure 5:
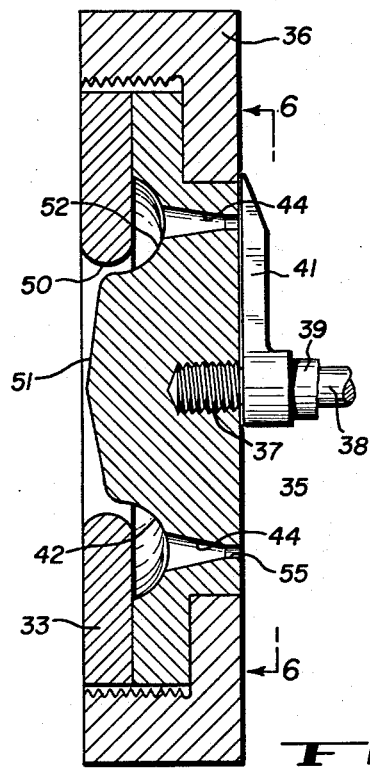
FIG. 5 is a side elevation, cross-sectional view of the extruding die according to the invention.
Figure 6:
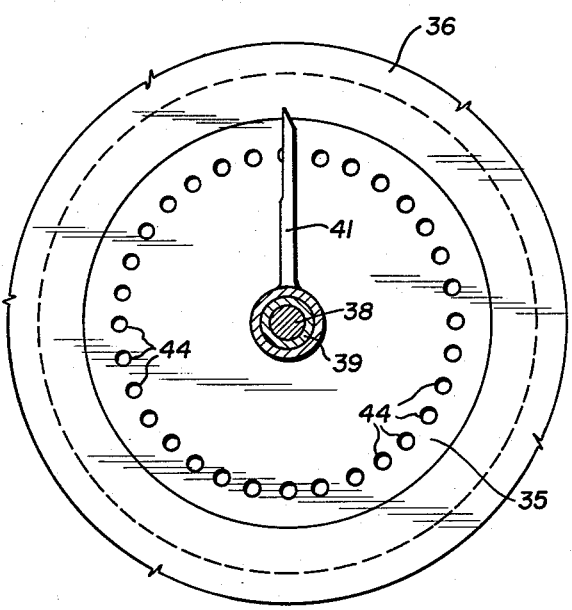
FIG. 6 is a front elevational view of the die mechanism of FIG. 5 with its cutoff knife.

The die block is shown in detail in FIG. 5 along with the washer 33 in its positioning in the ring 36. The internal opening of the washer 33 is provided with a rounded configuration 50 which is closely spaced to the edge of the internal boss 51 of the die plate 35. The die plate has a semicircular groove 52 extending around the boss and the annular opening between the boss and the washer is maintained at about .060 inch. Leading from the groove 52 are a plurality of openings 54 which are tapered for a portion of their length and then end in a small cylindrical portion 55. As previously explained the washer 33 is bolted to the insert and the die plate 35 is held in place on the washer by means of the cap 36 which is threaded to the exterior of the housing 5.

The insert 26 is held in place in the housing 5 by means of pins 56 extending through two opposed openings in the housing, one pin being shown in FIG. 1, registering with openings 57 in the insert. Thus the insert is maintained in position but is easily removed for cleaning. The screen covering 7 is also held in position by means of links 58 interconnecting the screen with the pins 56 on the housing.

Figure 7:
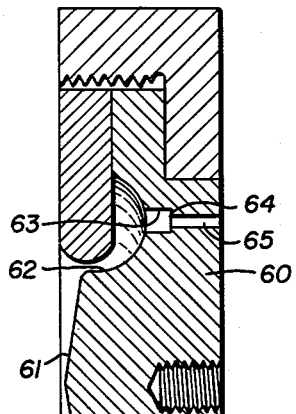
FIG. 7 is a partial, cross-sectional view of a modified die according to the invention.

A modification of the extrusion orifices is illustrated in FIG. 7, wherein a die block 60 is provided with a boss 61 similar to that shown in FIG. 5 and an arcuate groove 62 is provided around the boss 61. The orifices in the die block, however, are provided with two cylindrical portions which include a larger cylindrical portion 63 interconnected by a shoulder 64 with a smaller outlet cylindrical portion 65. In either case, the number of orifices in the die block are determined by the spacing in accordance with design practices for strength of the plate, and the area of opening to obtain the high pressure.

For operation of the machine a cereal grain, which is preferably pre-ground and which may be corn, rice, popcorn, soya beans, or various other edible grains, is loaded in the hopper. The grain is then passed from the hopper through the blender, and where necessary with a small amount of water from the line 14, into the auger. The auger is rotated to move the grain from the opening to the die head. The auger having a very small clearance with the insert exerts sufficient pressure and friction to build up the heat and pressure necessary to liquidate the grain, which gelatinizes the starch in the grain and partially cooks the grain. The high pressure in the device not only liquifies the grain, gelatinizes the starch, but, also, turns the water in the liquid mass into steam. The heat generated may extend as high as from about 200°–250° F. and the pressure from 2,500 pounds per square inch upwards to about 5,000 pounds per square inch or greater which is sufficient to gelatinize the starch. The auger moves the material under pressure through the annular opening between the washer and the boss on the die plate into the channel 52 around the boss on the die plate. From this channel the material is extruded through the orifices 44 in the die plate aided by the pressure of the produced steam in the material. With sufficient temperature and pressure most of the starch in the product is converted to sugar. The substantially complete gelatinization and expansion of the product the starch cells of the original grain are generally broken down to produce a readily digestible product. As the extruded mass contacts the atmosphere outside of the die head, it is cooled and becomes a gelatinized, expanded, puffed mass. The final product until further processed is essentially a porous, spongy mass of a cylindrical configuration. The cut off blade rotates around the stationary die to cut off lengths of the cylindrical, spongy material. By providing the knife with a variable speed drive the length of the cylindrical material may be readily controlled to that desired. The final product as it solidifies and is cut off by the knife has a substantially increased bulk from that of the original material.

The various grains may be singly fed into the machine or they may be blended to produce various types of blended products. Under the extreme pressure and temperature the material is subjected to in the machine, the grain is partially cooked and the contained starch is gelatinized in a liquid mass which sets up and congeals when the material is extruded from the machine and strikes the atmosphere. The material extruded from the die resists breaking and dusting even after additional treatment which may be further baking; coating with various types of coatings which includes cheese and the like; salting; etc.

While the invention has been described with reference to specific details there is no intent to limit the spirit or scope of the invention to precise details so set forth except as defined in the following claims.

We claim:

1. A die plate organization for use with a machine for liquidizing and extruding cereal grains, said machine including a housing having a bore therein, a sleeve mounted in said bore and having helical threads on the internal surface thereof, an auger mounted for rotation within said sleeve and having helical threads on the external surface thereof, the diameter of said threads on said auger being less than the internal diameter of the threads on the internal surface of said sleeve to define between said sleeve and auger an axially-extending annular passage, said die plate organization closing said bore at one end thereof and comprising, in combination, a die plate having front and rear surfaces; an axially-extending, centrally-positioned boss on the rear surface of said die plate, said boss extending toward said auger; means defining an annular groove of substantially semicircular transverse cross section positioned in said rear surface of said die plate and surrounding said boss immediately adjacent thereto; an annular member abutting said rear surface of said die plate and having an inner axial surface surrounding said boss in closely juxtaposed relation therewith to define therebetween a short, narrow annular passage opening at one end into said annular groove and at the other end into said axially-extending annular passage; and means defining a plurality of extrusion orifices extending from the bottom of said circular groove, through said die plate to the front surface thereof, said annular passages, said annular groove and said extrusion orifices extending parallel to the axis of the auger and being disposed in substantially axial alignment with respect to each other to provide a substantially straight flow path for the cereal grains extruded through the machine, upon rotation of said auger, and into the atmosphere through said extrusion orifices to produce a puffed cereal product.

2. A die plate organization as defined in claim 1, wherein the outer peripheral surfaces of said axially-extending, centrally positioned boss on the rear surface of said die plate is curved and constitutes a portion of the wall defining said annular groove of substantially semicircular transverse cross section.

3. A die plate organization as defined in claim 1, wherein the inner axial surface of said annular member which abuts said rear surface of said die plate and surrounds said boss to define said short, narrow annular passage is of arcuate configuration.

References Cited by the Examiner

UNITED STATES PATENTS

| | | | |
|---|---|---|---|
| 287,010 | 10/83 | Desgoffe et al. | 198—213 |
| 2,853,027 | 9/58 | Graves | 99—238 |
| 3,018,715 | 1/62 | McCleary et al. | 99—238 |

ROBERT E. PULFREY, *Primary Examiner.*

JEROME SCHNALL, *Examiner.*